(12) United States Patent
Heegard et al.

(10) Patent No.: US 6,823,488 B1
(45) Date of Patent: Nov. 23, 2004

(54) PACKET BINARY CONVOLUTIONAL CODES

(75) Inventors: Chris Heegard, Santa Rosa, CA (US); Matthew B. Shoemake, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/366,963

(22) Filed: Aug. 4, 1999

Related U.S. Application Data
(60) Provisional application No. 60/098,089, filed on Aug. 27, 1998.

(51) Int. Cl.[7] ............................................. H03M 13/03
(52) U.S. Cl. ..................................................... 714/786
(58) Field of Search ............................... 714/746, 786, 714/784

(56) References Cited

U.S. PATENT DOCUMENTS

| | | | |
|---|---|---|---|
| 4,495,619 A | | 1/1985 | Acampora .................... 330/104 |
| 4,639,548 A | * | 1/1987 | Oshima et al. ................ 380/43 |
| 5,204,876 A | | 4/1993 | Bruckert et al. ............. 315/186 |
| 5,233,629 A | * | 8/1993 | Paik et al. .................... 375/262 |
| 5,416,797 A | * | 5/1995 | Gilhousen et al. .......... 370/209 |
| 5,537,430 A | | 7/1996 | Park et al. .................... 714/786 |
| 5,917,852 A | * | 6/1999 | Butterfield et al. ......... 375/141 |

FOREIGN PATENT DOCUMENTS

| EP | 0 407 673 | 1/1991 | ........... H04L/27/34 |
|---|---|---|---|

OTHER PUBLICATIONS

Jain, Y., "Convolutional codes improve bit–error rate in digital systems," *EDN Electrical Design News*, Cahners Publishing Co., vol. 35, No. 17, Aug. 20, 1990, pp. 129–134.

* cited by examiner

*Primary Examiner*—Guy J. Lamarre
*Assistant Examiner*—Esaw Abraham
(74) *Attorney, Agent, or Firm*—Abdul Zindani; W. James Brady, III; Frederick J. Telecky, Jr.

(57) ABSTRACT

A 64-state binary convolutional code is disclosed for a high-speed physical layer (PHY) of a communication network. The proposed code provides improved performance in terms of signal to noise ratio (SNR) and multi-path rejection than previously known codes. The proposed system, which includes binary convolutional codes with scrambling in a packet-based system, is referred to herein as "packet binary convolutional coding" (PBCC). The substantial increase in performance that may be achieved by PBCC makes it an ideal solution for high performance forward error correction (FEC) in a high-speed PHY.

15 Claims, 4 Drawing Sheets

PACKET BINARY CONVOLUTIONAL CODES

This application claims the benefit of U.S. provisional application No. 60/098,089 filed on Aug. 27, 1998.

FIELD OF THE INVENTION

The present invention relates to convolutional coding for data communications, and more particularly to a convolutional code that is scrambled by a pseudo-random (PN) sequence to rotate selected, transmitted symbols by 90 degrees.

BACKGROUND OF THE INVENTION

Current network communications systems generally utilize a layered, packet-based approach for transmitting data, although a non-packet based (i.e., continuous) data format may also be used. In such networks, the purpose of each layer is to offer particular services to the higher layers. Each layer is shielded from the details of how the services are actually implemented. The lowest layer is the physical layer (PHY), which is concerned with transmitting raw bits over a communication channel. The goal of the physical layer is to make sure that when the transmitted bit is a "1", it is decoded by the receiver as a "1" and not as a "0", and vice-versa.

One technique for communicating data over the physical layer is known as trellis coded modulation (TCM). TCM is a combined Forward Error Correction (FEC) coding and modulation scheme that utilizes an underlying convolutional code applied to certain bits of M-ary Phase Shift Keyed (MPSK) or M-ary Quadrature Amplitude Modulation (MQAM) symbol mappings. The utility of TCM is in providing an increased data rate over bandlimited channels using straightforward decoding hardware. See, e.g., Viterbi, Andrew et. al., "A Pragmatic Approach to Trellis-Coded Modulation," *IEEE Communications Magazine*, July 1989, pp. 11–19.

Currently, various convolutional codes are under discussion for use in a high-speed PHY that operates, e.g., at a carrier frequency of 2.4. GHz. It would be advantageous to introduce such a code that produces improved performance in terms of signal to noise ratio (SNR) and multi-path rejection. The provision of such a code would advantageously allow the high-speed PHY to be used in a greater range of applications than would be possible with previously proposed techniques, such as complementary code key (CCK) modulation.

It would be further advantageous to provide a binary convolutional code that generates sufficient gain to enable improved range, improved throughput, and reduced transmission delay. Moreover, an encoder for such a code should have low computational complexity. Still further, it would be advantageous if the mechanism for using such a code would be similar to the multi-rate mechanism already provided for supporting optional rates set forth in the IEEE 802.11b wireless local area network standard.

The present invention provides a binary convolutional code having the aforementioned and other advantages.

SUMMARY OF THE INVENTION

In accordance with the present invention, a method is provided for convolutionally encoding digital data for transmission over a communication channel. In a first embodiment, the data are processed using a 64-state, rate 1/2 binary convolutional code based on octal generators 133, 175 to provide binary convolutional coded codewords. The codewords may be scrambled prior to transmission over the communication channel.

In a preferred embodiment, the codewords are encoded jointly onto in-phase (I) and quadrature (Q) channels. The codeword bits are mapped to a constellation according to a binary pseudo-random scramble sequence (also referred to as a cover sequence). In the event that a bit of the scramble sequence corresponding to a particular codeword bit has a binary value of, e.g., zero, the constellation is maintained in a current relationship with respect to the constellation axes. In the event that the corresponding bit of the scramble sequence has the opposite binary value (e.g., one), the constellation is rotated by ninety degrees, e.g., in a counterclockwise direction.

The scramble sequence can be generated from a seed sequence such as the sequence 0011001110001011, where the first bit of the sequence in time is the left most bit.

Apparatus is disclosed for encoding data for use in digital communications systems. The apparatus includes a binary convolutional encoder and a scrambler for scrambling codewords provided by the encoder prior to transmission over a communication channel. In an illustrated embodiment, the scrambler is responsive to a scramble pattern generator.

In a second embodiment, the data are processed using a 64-state, rate 2/3 binary convolutional code based on octal generators $$\begin{pmatrix} 21, 02, 12 \\ 10, 25, 12 \end{pmatrix}$$

to provide binary convolutional coded codewords.

The generator matrix "G" for the rate 2/3 code can comprise:

$$G(D) = \begin{bmatrix} D^4 + 1 & D & D^3 + D \\ D^3 & D^4 + D^2 + 1 & D^3 + D \end{bmatrix}$$

In octal notation, this matrix is defined as $$G = \begin{pmatrix} 21, 02, 12 \\ 10, 25, 12 \end{pmatrix}.$$

A block diagram illustrating one possible, implementation for the BCC rate 2/3 encoder 50 is illustrated in FIG. 6. The illustrated encoder consists of separate paths for the two input bits m0 (the least significant bit) and m1 (the most significant bit). The path for m0 comprises four delay elements 60, which can simply comprise memory registers as well known in the art. The path for m1 comprises four additional delay elements 62. As indicated above, for every two bits (m0, m1) input, three bits are generated at the encoder output. The three output bits are designated x0, x1 and x2, where x0 is the least significant bit (1sb) and x2 is the most significant bit (msb). Modulo-2 adders 64 are connected to specific outputs of the delay elements to implement the desired generator matrix which, in the case illustrated by FIG. 5, is represented in octal as $$G = \begin{pmatrix} 21, 02, 12 \\ 10, 25, 12 \end{pmatrix}.$$

The output of the BCC is mapped to a constellation using, e.g., 8 PSK. An example 8 PSK constellation is shown in FIG. 7. Each triplet of output bits (000, 001, 010, 011, 100, 101, 110 and 111) from the BCC is used to produce one symbol. As with the embodiments of FIGS. 1-4, the mapping from BCC outputs to PSK constellation points in the 8 PSK mode is determined by the pseudo-random scramble sequence generated by scramble pattern generator 14. If the value of the scramble sequence is equal to one, then the constellation is rotated, e.g., counter-clockwise by ninety degrees relative to the constellation that is provided for a scramble sequence value of zero. As shown in FIG. 7, the constellation for S=1 ifs rotated by ninety degrees with respect to the corresponding constellation for S=0. The pseudo-random sequence can be the same as described above in connection with the embodiments of FIGS. 1-4.

It should now be appreciated that the present invention provides various new and unique binary convolutional coding schemes. Moreover, an inventive scheme is disclosed for scrambling the encoded data prior to transmission over a communication channel. The scrambling assures that delayed versions of the codeword will not "look" like codewords to the receiver. Instead, they will look like uncorrelated noise, which improves multi-path immunity. A PN-sequence generator can be easily implemented for use in providing the scramble sequence. It is noted that long scramble sequence will improve performance with respect to co-channel interference.

The invention further provides new BCC generator structures, which can advantageously be used with the disclosed scramble sequence. Moreover, long sequences are generated from a shorter seed sequence through cyclic shifts. The concept of scrambling by rotating the constellation (e.g., by 90°) is also unique.

Although the invention has been described in connection with various preferred embodiments, it should be appreciated that numerous modifications and adaptations may be made thereto without departing from the scope of the invention as set forth in the claims.

DETAILED DESCRIPTION OF THE INVENTION

The present invention provides a method and apparatus for encoding data for use in digital communications systems. More particularly, a binary convolutional coding (BCC) scheme with a 64-state binary convolutional code and a scramble sequence is disclosed. It is noted that schemes with other codes (e.g., an N-state BCC) can also be provided in accordance with the invention. The output of the BCC is encoded jointly onto corresponding in-phase (I) and quadrature (Q) communication channels, as further documented hereinafter. This provides enhanced multi-path performance and reduced complexity in comparison to the use of two generators and independent encoding of the I and Q channels. The scramble sequence also provides added multi-path immunity.

Figure 1:
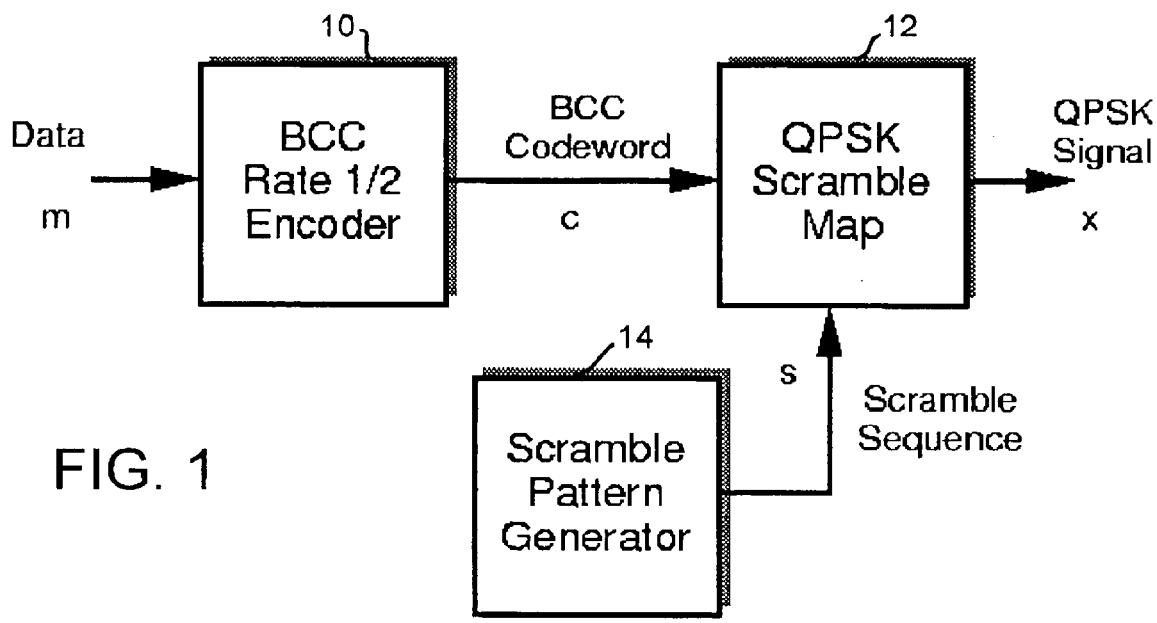
FIG. 1 is a block diagram of a first embodiment of a binary convolutional coding (BCC) encoder in accordance with the present invention.

One possible implementation of an encoder in accordance with the present invention is illustrated in FIG. 1. Incoming data are first encoded in a BCC encoder 10 (e.g., a rate 1/2 encoder) with a binary convolutional code that is well suited for difficult channels such as wireless communications channels. An example of such a code is described in detail below, although it should be appreciated that the present invention also applies to other codes that will be apparent to those skilled in the art. The encoded data are scrambled using, e.g., a QPSK scramble map 12, before transmission through the communication channel. The QPSK scramble map is responsive to a scramble pattern generator 14, such as a pseudo-random sequence generator, for scrambling the encoded data from the encoder 10. As will be appreciated by those skilled in the art, the encoder of FIG. 1 outputs two bits (QPSK) for every one bit input, thus implementing the rate 1/2.

A binary convolutional code that can be used for example, is a 64-state, rate 1/2 code. The generator matrix "G" for one such code is given as $$G=[D^6+D^4+D^3+D+1, D^6+D^5+D^4+D^3+D^2+1]$$

or in octal notation, it is given by G=[133, 175]. This code provides a good trade-off between additive white Gaussian noise (AWGN) performance and performance in multi-path environments.

The data used in this scheme may be continuous or packet based. If the invention is used in a packet-based system, then the encoder is placed in a known state at the beginning and the end of every packet. This prevents the data bits near the end of the packet from being substantially less reliable than those early on in the packet. To place the encoder in a known state at the beginning of a packet, the M memory elements of the convolutional encoder (e.g., the six memory elements 20 described below in connection with FIG. 2) are loaded with predetermined values that are typically all zeros. To place the encoder ink a known state at the end of a packet, M (e.g., six) deterministic bits are input immediately following the last data bit input to the convolutional encoder. These bits are typically all zero, which places the encoder in the zero state.

Figure 2:
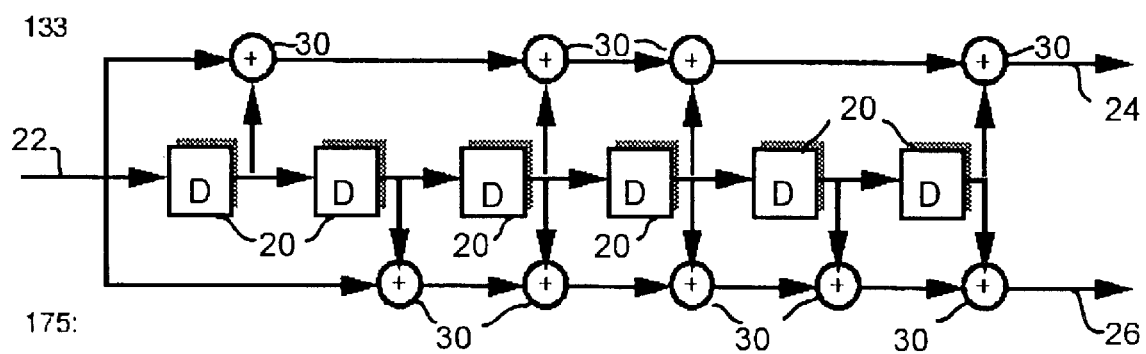
FIG. 2 is a block diagram of an example implementation for the BCC encoder of FIG. 1.

A block diagram of one possible implementation of BCC rate 1/2 encoder 10 is shown in FIG. 2. The illustrated encoder consists of six memory (i.e., delay) elements designated by reference numeral 20. For every data bit input at input terminal 22, two output bits are generated at terminals 24, 26. Modulo-2 adders 30 are connected to specific outputs of the memory element stages to implement the desired generator matrix, which in the case illustrated by FIG. 2 is G=[133, 175]. Thus, as illustrated, adders 30 are provided at stages D, $D^3$, $D^4$, and $D^6$ to implement G=133 and adders 30 are provided at stages $D^2$, $D^3$, $D^4$, $D^5$, and $D^6$ to implement G=175.

Figure 3:
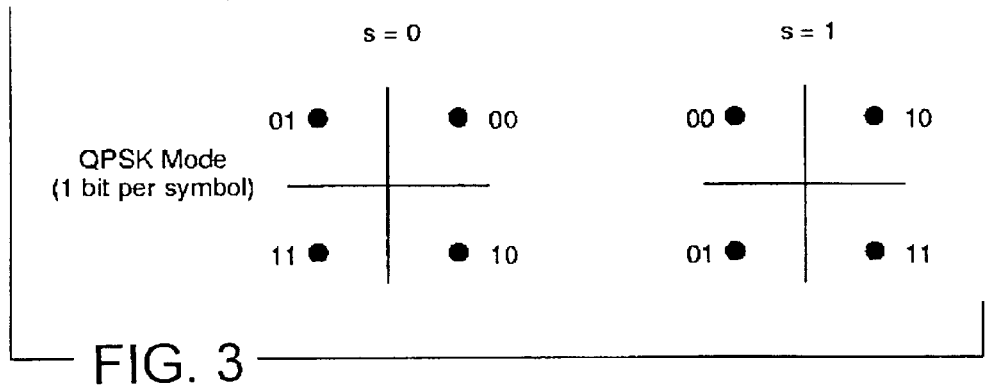
FIG. 3 is a diagram showing a possible QPSK mapping with 90° rotation in accordance with the invention.
Figure 4:
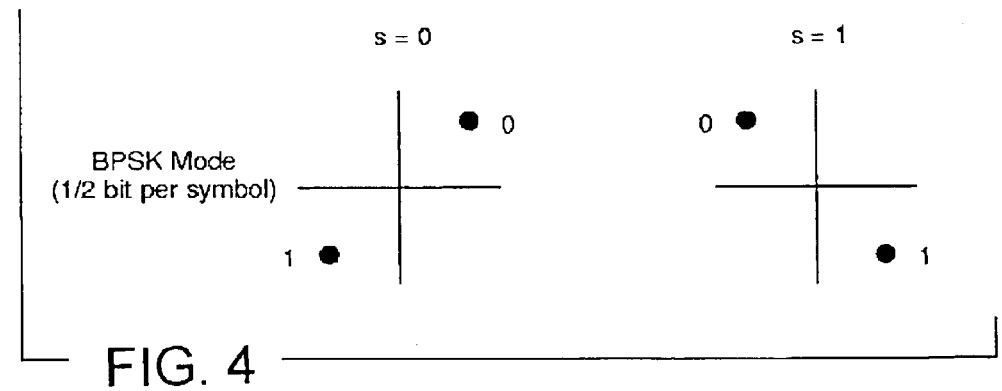
FIG. 4 is a diagram showing a possible BPSK mapping with 90° rotation in accordance with the invention.

The output of the binary convolutional code is mapped to a constellation using one of two possible modes. One mode uses quadrature phase shift keying (QPSK), as shown in FIG. 3, and the other uses binary phase shift keying (BPSK) as shown in FIG. 4. In the QPSK mode, each pair of output bits (00, 01, 10, 11) from the binary convolutional code is used to produce one symbol, while in the BPSK mode, each pair of bits from the BCC is taken serially and used to produce two PSK symbols. This yields a throughput of one bit per symbol in QPSK mode and one-half a bit per symbol in BPSK mode.

The mapping from BCC outputs to PSK constellation points in the BPSK and QPSK modes is determined by a pseudo-random scramble sequence generated by scramble pattern generator 14 (FIG. 1). If the value of the scramble sequence is equal to one, then the constellation is rotated counter-clockwise by ninety degrees relative to the constellation that is provided for a scramble sequence value of zero. This is shown for the QPSK mode in FIG. 3 and for the BPSK mode in FIG. 4. More particularly, it can be seen from the figures that the constellation for S=1 is rotated by ninety degrees with respect to the corresponding constellation for S=0. It should be appreciated that other implementations can be provided where, e.g., the constellation is rotated in a clockwise direction instead of a counterclockwise direction, or in which rotations of other than 90° are used.

The pseudo-random scramble sequence is generated from a seed sequence. The seed sequence can comprise, for example, the 16-bit sequence 0011001110001011, where the first bit of the sequence in time is the left most bit. This sequence in octal notation is given as 150714, where the least significant bit is the first in time. This seed sequence is used to generate the pseudo-random scramble sequence of length 256 bits that is used in the mapping of the current PSK symbol. It is the current binary value of this sequence at every given point in time that is taken as "S" in FIGS. 3 and 4.

This sequence of 256 bits is produced by taking the first sixteen bits of the sequence as the seed sequence, the second sixteen bits as the seed sequence cyclically left rotated by three, the third sixteen bits as the seed sequence cyclically left rotated by six, etc. If ci is the ith bit of the seed sequence, where 0<=i<=15, then the sequence that is used to scramble the data are given row-wise as follows:

```
c0 c1 c2 c3 c4 c5 c6 c7 c8 c9 c10 c11 c12 c13 c14 c15 c3 c4 c5
c6 c7 c8 c9 c10 c11 c12 c13 c14 c15 c0 c1 c2 c6 c7 c8 c9 c10
c11 c12 c13 c14 c15 c0 c1 c2 c3 c4 c5 . . . c10 c11 c12 c13
c14 c15 c0 c1 c2 c3 c4 c5 c6 c7 c8 c9 c13 c14 c15 c0 c1 c2
c3 c4 c5 c6 c7 c8 c9 c10 c11 c12
```

For packet based systems with more than 256 bits and continuous systems, this sequence of 256 bits is simply repeated.

Figure 5:
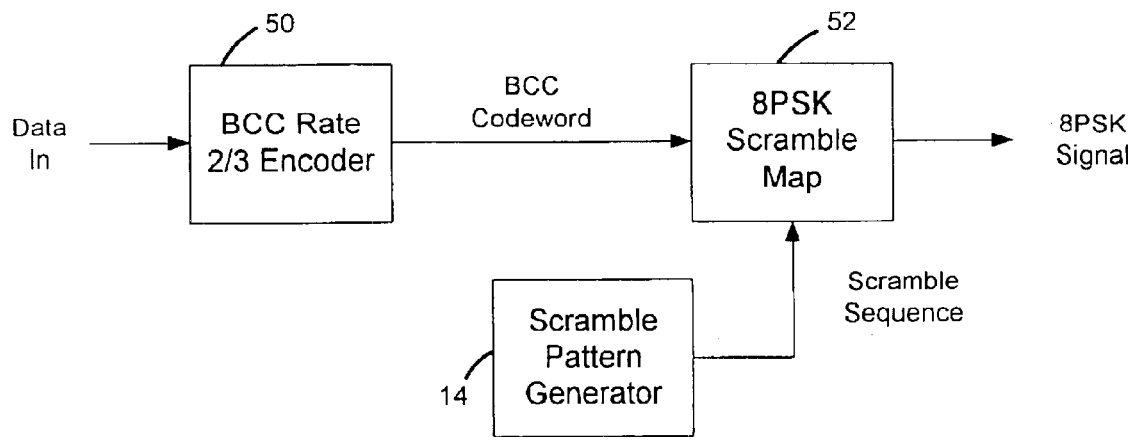
FIG. 5 is a block diagram of a second embodiment of a BCC encoder in accordance with the present invention.
Figure 6:
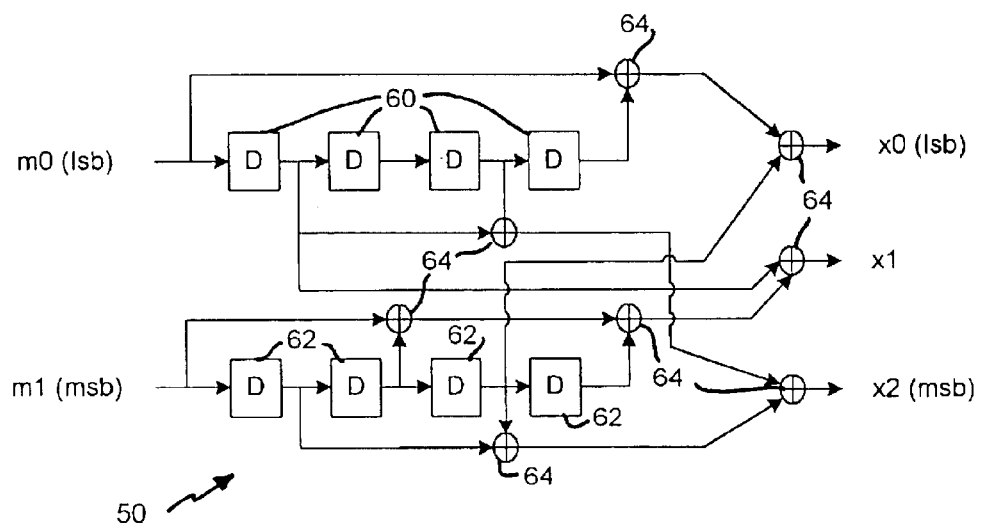
FIG. 6 is a block diagram of an example implementation for the BCC encoder of FIG. 5.
Figure 7:
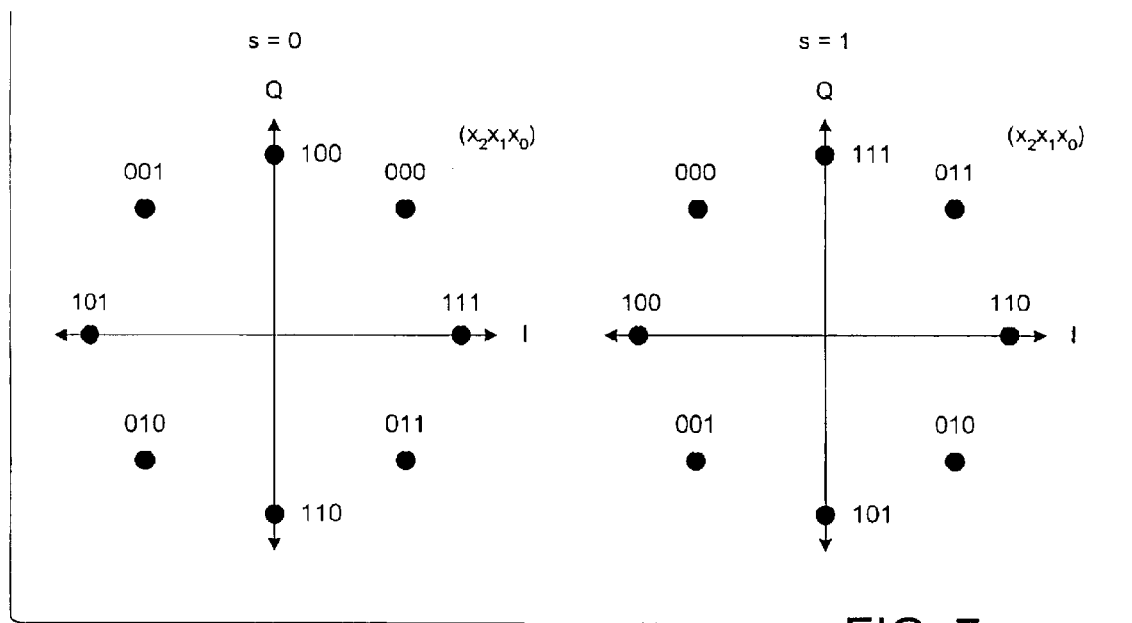
FIG. 7 is a diagram showing a possible 8 PSK mapping with 90° rotation in accordance with the invention.

FIGS. 5 to 7 illustrate another embodiment in which a 256-state, rate 2/3 code is implemented. Such an embodiment can be used to provide, for example, a 22 Mbps PBCC. Referring to FIG. 5, incoming data are first encoded in a rate 2/3 BCC encoder 50. The encoded data are scrambled using, e.g., an 8 PSK scramble map 52, before transmission through the communication channel. The 8 PSK scramble map is responsive to a scramble pattern generator 14, which can be identical to that described above in connection with the rate 1/2 QPSK embodiment of FIG. 1. As will be appreciated by those skilled in the art, the encoder of FIG. 5 outputs three bits (8 PSK) for every two bits input, thus implementing the rate 2/3.

What is claimed is:

1. A method for convolutionally encoding digital data for transmission over a communication channel, comprising the step of:

processing said data using one of a 64-state, rate 1/2 binary convolutional code (BCC) based on octal generators 133, 175 or a 256-state, rate 2/3 BCC based on octal generators $$\begin{pmatrix} 21 & 02 & 12 \\ 10 & 25 & 12 \end{pmatrix}$$

to provide binary convolutional coded codewords.

2. A method in accordance with claim 1 comprising the further step of:

scrambling said codewords prior to transmission over said communication channel.

3. A method in accordance with claim 2 wherein said codewords are encoded jointly onto in-phase (I) and quadrature (Q) channels.

4. A method in accordance with claim 2 the scrambling step comprising the further steps of:

mapping said codewords to a constellation according to a pseudo-random scramble sequence comprising bits having one of first and second binary values;

in the event a bit of the scramble sequence has said first binary value, maintaining said constellation in a current relationship with respect to constellation axes; and in the event a bit of the scramble sequence has said second binary value, rotating said constellation.

5. A method in accordance with claim 4 wherein said scramble sequence is generated from a seed sequence 0011001110001011, where the first bit of the sequence in time is the left most bit.

6. A method in accordance with claim 4, wherein said constellation is rotated counterclockwise in the event said bit of the scramble sequence has said second binary value.

7. A method in accordance with claim 6, wherein said counterclockwise rotation comprises a ninety degree rotation.

8. Apparatus for encoding data for use in digital communications systems comprising:

a binary convolutional encoder for processing said data using one of a 64-state, rate 1/2 binary convolutional code (BCC) based on octal generators 133, 175 or a 256-state, rate 2/3 BCC based on octal generators $$\begin{pmatrix} 21 & 02 & 12 \\ 10 & 25 & 12 \end{pmatrix}$$

to provide binary convolutional coded codewords.

9. Apparatus in accordance with claim 8, further comprising a scrambler coupled to the output of said encoder, wherein said scrambler is responsive to a scramble pattern generator.

10. Apparatus in accordance with claim 8 wherein said codewords are encoded jointly onto in-phase (I) and quadrature (Q) channels.

11. Apparatus in accordance with claim 8 wherein:

said codewords are mapped to a constellation according to a pseudo-random scramble sequence comprising bits having one of first and second binary values;

in the event a bit of the scramble sequence has said first binary value, maintaining said constellation in a current relationship with respect to constellation axes; and in the event a bit of the scramble sequence has said second binary value, rotating said constellation.

12. Apparatus in accordance with claim 11, wherein said constellation is rotated counterclockwise in the event said bit of the scramble sequence has said second binary value.

13. Apparatus in accordance with claim 12, wherein said counterclockwise rotation comprises a ninety degree rotation.

14. Apparatus in accordance with claim 8 further comprising a scrambler for scrambling codewords provided by said encoder prior to transmission over a communications channel.

15. A method for convolutionally encoding digital data for transmission over a communicator channel, comprising the steps of:

encoding data to be communicated over a communication channel using a binary convolutional code to provide codewords; and mapping said codewords to a constellation according to a pseudo-random scramble sequence comprising bits having of first and second binary values;

in the event a bit of the scramble sequence has said first binary value, maintaining said constellation in a current relationship with respect to constellation axes; and in the event a bit of the scramble sequence has said second binary value, rotating said constellation.

* * * * *